United States Patent [19]

Astle

[11] Patent Number: 5,691,775
[45] Date of Patent: Nov. 25, 1997

[54] REDUCTION OF MOTION ESTIMATION ARTIFACTS

[75] Inventor: Brian Astle, Plainsboro, N.J.

[73] Assignee: Intel Corporation, Santa Clara, Calif.

[21] Appl. No.: 413,189

[22] Filed: Mar. 30, 1995

[51] Int. Cl.⁶ .................................................. H04N 7/12
[52] U.S. Cl. .......................... 348/416; 364/514 A; 382/239
[58] Field of Search .................................. 348/416, 415,
348/409, 390, 384, 411, 412, 413, 414,
426, 400, 401, 402, 403, 404, 405, 406,
407, 408, 410, 417, 418; 364/514 A, DIG. 1,
DIG. 2; 370/118, 465, 477; 382/239, 236

[56] References Cited

U.S. PATENT DOCUMENTS

| | | |
|---|---|---|
| 3,632,865 | 1/1972 | Haskell et al. ............ 348/416 |
| 4,218,703 | 8/1980 | Netravali et al. .......... 348/416 |
| 4,691,230 | 9/1987 | Kaneko et al. ............ 348/416 |
| 4,849,810 | 7/1989 | Ericsson . |
| 4,862,264 | 8/1989 | Wells et al. ............... 348/416 |
| 4,941,043 | 7/1990 | Jass . |
| 5,019,901 | 5/1991 | Uomori et al. . |
| 5,126,841 | 6/1992 | Tanaka et al. . |
| 5,150,209 | 9/1992 | Baker . |
| 5,151,784 | 9/1992 | Lavagetto et al. . |
| 5,173,773 | 12/1992 | Ueda et al. . |
| 5,198,901 | 3/1993 | Lynch . |
| 5,200,820 | 4/1993 | Gharavi .................... 348/416 |
| 5,220,616 | 6/1993 | Downing et al. . |
| 5,251,028 | 10/1993 | Iu . |
| 5,329,318 | 7/1994 | Keith . |
| 5,430,886 | 7/1995 | Furtek ...................... 348/416 |
| 5,436,666 | 7/1995 | Astle . |

Primary Examiner—Wellington Chin
Assistant Examiner—Huy D. Vu
Attorney, Agent, or Firm—William H. Murray; N. Stephan Kinsella

[57] ABSTRACT

A computer-implemented method and apparatus for processing video signals representative of pixels of a current block of a current picture. According to a preferred embodiment, the current block is compared to a plurality of blocks of a previous picture to provide a plurality of corresponding motion vectors, wherein each motion vector corresponds to a respective motion estimation error measure. It is determined whether the current block contains at least one region of high spatial energy and at least one region of relatively low spatial energy associated with different motion vectors of the plurality of corresponding motion vectors. The block is encoded in accordance with this determination.

18 Claims, 8 Drawing Sheets

REDUCTION OF MOTION ESTIMATION ARTIFACTS

BACKGROUND OF THE INVENTION

1. Field of the Invention

The present invention relates to signal processing and, in particular, to computer-implemented processes and apparatuses for reducing motion estimation artifacts.

2. Description of the Related Art

This invention relates to signal processing which is often used to compress video image signals representative of video pictures into an encoded bitstream. Each picture may be a still image, or may be part of a plurality of successive pictures of video signal data that represent a motion video. As used herein, "picture" and "video picture" may interchangeably refer to signals representative of an image as hereinabove described.

The portion of an encoded bitstream representing a compressed picture may be stored in a mass storage device such as a hard disk drive or compact disk read-only-memory (CD-ROM) in its compressed format in order to conserve storage space. When the compressed picture is later retrieved it may be decompressed and, for example, displayed on a monitor. A higher amount of compression of the blocks constituting an image tends to lower the number of bits needed to represent the image, but also tends to diminish the quality of the image reconstructed by the decoder.

The encoded bitstream may also be transmitted to one or more remote signal processing systems such as video conferencing nodes. These video conferencing nodes may be personal computer (PC) based systems communicating with each other over a selected transmission medium. Because transmission media have finite bandwidths, in order to provide video conferencing of satisfactory quality, each PC system preferably compresses or encodes in real time the video signals corresponding to the local participant and transmits the resulting compressed signals or bitstreams to the PC systems of the remote participants. In such a video conferencing system, each PC system also preferably receives and decompresses compressed signals from the PC systems of the remote participants to play the decompressed video signals locally. The encoder may also, in some usages, encode video pictures offline to perform more computation intensive and more efficient encoding.

Such encoding operations that compress video image signals typically operate on subsets of the image, such as (8×8) blocks of pixels, or on macroblocks comprising a number of such blocks. A macroblock comprises a (16×16) array of luminance pixels (also known as "luma pels") and two associated (8×8) blocks of chroma information. The (16×16) luma array is further divided into four (8×8) blocks, and all six blocks in a macroblock are transformed using the forward discrete cosine transform (DCT), quantized, and encoded.

Thus, the (8×8) blocks of the image to be encoded are typically transformed by a forward DCT to generate a transformed signal comprising 64 DCT coefficients, which are also arranged in an (8×8) block. One technique for controlling the bit rate of the encoded bitstream is to select varying quantization levels, represented in quantization tables, at the encoding stage. In quantization, each DCT coefficient is divided by the quantizer in the corresponding (8×8) block position in order to reduce the number of bits needed to represent the coefficient. As is appreciated by those skilled in the art, use of a coarser quantization table implies using fewer bits to encode an image but at the cost of image quality. Use of finer quantization tables results in encoded bitstreams with more bits but with higher quality images upon decompression or decoding. This type of bit rate control is often referred to as primary bit rate control. Secondary bit rate control involves the dropping of pictures or images from the video stream. The secondary bit rate control is a back-up mode in case the primary bit rate control is insufficient. An example of a system for performing rate control and quantization of DCT coefficients is disclosed in U.S. Patent Application Ser. No. 08/332,523, filing date Oct. 31, 1994, entitled "Image Signal Encoding with Low-Pass Filter", the entirety of which is incorporated herein by reference.

Motion estimation is commonly utilized in signal processing techniques in which successive video pictures are compressed. Motion estimation techniques exploit the temporal correlation that often exists between consecutive pictures, in which there is a tendency of some objects or image features to move within restricted boundaries from one location to another from picture to picture.

For instance, picture 1 may contain an object, and picture 2 may contain an identical set of pixels corresponding to the object spatially displaced by a few pixels from the location of the same set of pixels in picture 1. If picture 1 is transmitted by a video processor to a remote pixel processor or video processor (which performs any necessary decompression or other decoding), several blocks of picture 2 may be transmitted without the pixels corresponding to the object. Instead, information such as motion vectors is sent along with picture 2 blocks (which may also be compressed using other techniques). These motion vectors may be utilized by the remote receiving video processor when decoding the received picture 2 to reproduce the object from picture 1 at a new location within picture 2. Since motion vectors can be represented with fewer bits than the pixels that comprise the object, fewer bits need to be transmitted (or stored) in order to recreate the object in Picture 2. As will be appreciated by those skilled in the art, after correction using transmitted motion vectors, difference blocks may also be transmitted along with motion vectors to improve the reconstruction process. The difference blocks are used to reduce the residual errors remaining after motion compensation.

Pictures such as picture 1 that are not based on information from previously transmitted and decoded pictures are called intrapictures, or I pictures. Pictures which are encoded with motion compensation techniques are referred to as predicted pictures, or P pictures, since their content is predicted from the content of previous I or P pictures. Because a P picture may be utilized as a base for a subsequent P picture, its quality should be as high as possible. Motion compensation-encoded pictures that do not need to be used as the bases for further motion-compensated pictures are called bidirectional or B pictures. B pictures are not intended for motion compensation use, so may be of lower quality and after decoded and displayed are typically discarded and not remembered for future use. A B picture is predicted from either or both of two I or P pictures, one of which is displayed before the B picture, and one of which is displayed after the B picture. However, the two I or P pictures upon which a B picture is based are encoded and transmitted before the B picture so that the decoder has access to the two I and/or P pictures in order to construct the B picture after its encoded bitstream received. As is understood by those skilled in the art, I, P, and B pictures are utilized in coding standards such as MPEG-1, developed by the Moving Pictures Experts Group (MPEG) of the International Standards Organization (ISO), while other standards, such as H.261, developed by the International Telegraph Union (ITU), utilize only I and P pictures.

Thus, I pictures typically require the greatest number of bits to encode, P pictures require the next largest number of bits to encode, and B pictures require the least number of bits to encode. Such a scheme achieves satisfactory quality reconstructed video images, yet is more efficient in terms of the amount of bits that need to be transmitted than would be in simply transmitting a succession of I pictures.

When blocks of P or B pictures are transmitted using motion estimation techniques, however, for certain classes of pictures or types of motion video sequences, artifacts are caused by inaccuracies in the encoding process. Some regions of pictures often contain areas containing a relatively large amount of spatial, i.e. high frequency, detail, which are denoted as high spatial energy regions or as "busy" regions. Other regions have relatively little detail, and are known as "flat" or "smooth" areas or regions of pictures.

Where certain sequences of pictures contain a mixture of flat regions and busy regions, various artifacts can arise in the encoding/decoding process and become visible after decoding. When too coarse a quantization level is utilized, uncompensated and inaccurate DCT terms tend to produce visible effects. These effects are most visible in blocks which contain both a busy region and a flat region, but are less noticeable in busy regions themselves. Thus, if a block also contains a flat area, such artifacts may be noticeable in some portions of the block, and may appear as shifting, random points of noise, said to resemble mosquitoes. This artifact is also known as the corona effect.

Existing techniques include standards developed by the MPEG of the ISO, such as the MPEG-1 and MPEG-2 standards, and the H.261 standard, which was developed by the ITU. In existing encoding standards, it is difficult to predict and to correct for such artifacts.

There is thus a need for computer-implemented processes and apparatuses for detecting and reducing motion estimation artifacts.

SUMMARY

There is provided herein a computer-implemented method and apparatus for processing video signals representative of pixels of a current block of a current picture. According to a preferred embodiment of the invention, the current block is compared to a plurality of blocks of a previous picture to provide a plurality of corresponding motion vectors, wherein each motion vector corresponds to a respective motion estimation error measure. It is determined whether the current block contains at least one region of high spatial energy and at least one region of relatively low spatial energy associated with different motion vectors of the plurality of corresponding motion vectors. The block is encoded in accordance with this determination.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

In the present invention, there is disclosed a computer-implemented method and apparatus for detecting and reducing motion estimation artifacts. It is recognized that one case in which mosquitoes are produced is when there is a moving boundary between a relatively flat region and a relatively busy region, caused when these regions are associated with different motion vectors. In a preferred embodiment of the present invention this and related situations are detected, and steps taken to avoid mosquitoes and related artifacts that might otherwise be produced. Methods and apparatuses for performing these functions are described in further detail hereinbelow.

Video Processing System Hardware

Figure 1:
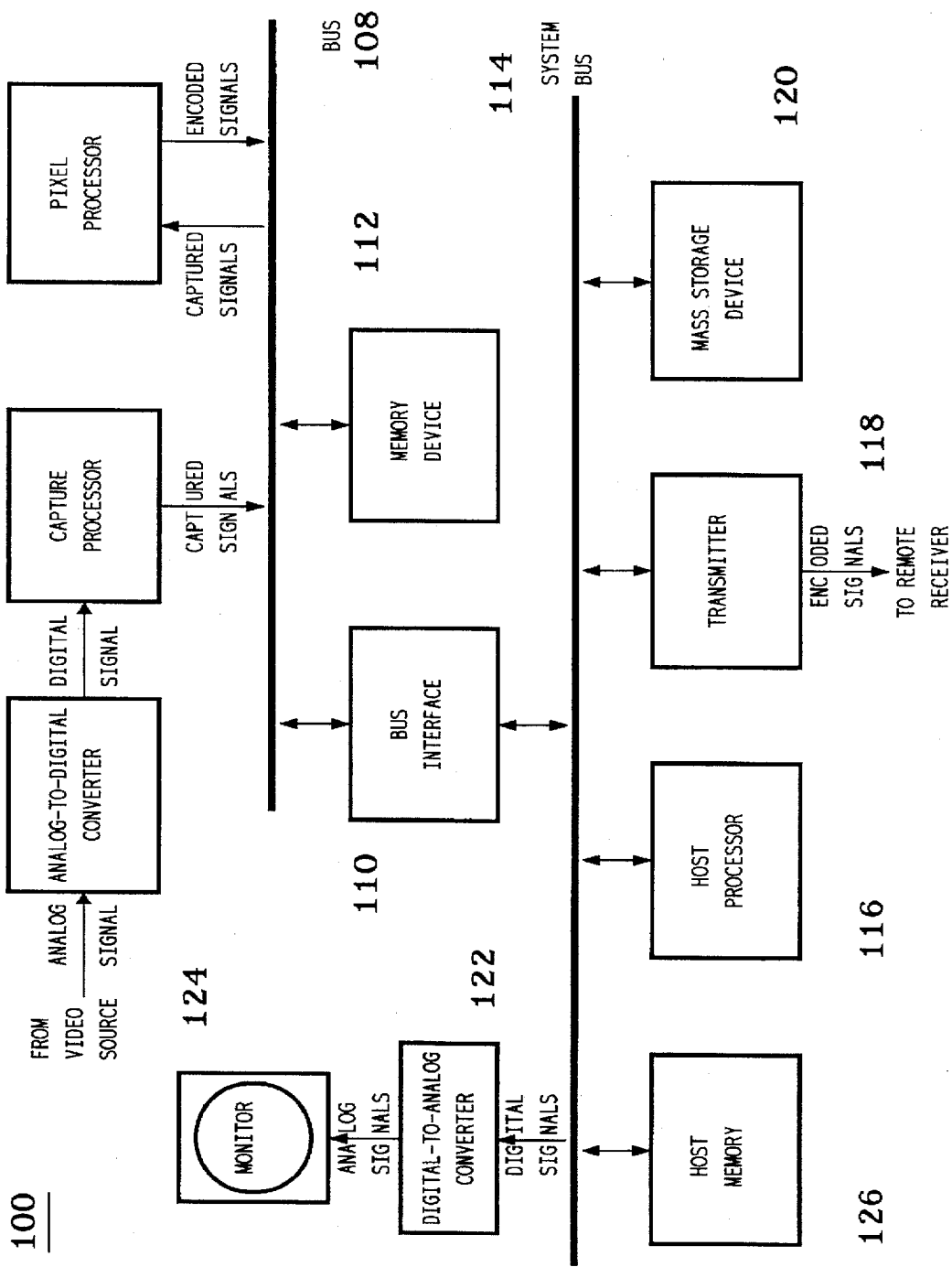
FIG. 1 is a computer-based video processing system for encoding video signals, according to a preferred embodiment of the present invention.

Referring now to FIG. 1, there is shown a computer-based encoding system 100 for encoding video image signals, according to a preferred embodiment of the present invention. Analog-to-digital (A/D) converter 102 of encoding system 100 receives analog video image signals from a video source. The video source may be any suitable source of analog video image signals such as a video camera or VCR for generating local analog video image signals or a video cable or antenna for receiving analog video image signals from a remote source. A/D converter 102 decodes (i.e., separates the signal into constituent components) and digitizes each picture of the analog video image signals into digital image component signals (e.g., in a preferred embodiment, Y, U, and V component signals).

Capture processor 104 receives, captures, and stores the digitized component signals as subsampled video images in memory device 112 via bus 108. Each subsampled video image is represented by a set of two-dimensional component planes or pixel bitmaps, one for each component of the digitized video image signals. In a preferred embodiment, capture processor 104 captures video image signals in a YUV9 or YUV4:1:1 format, in which every (4×4) block of pixels of the Y component plane corresponds to a single pixel in the U component plane and a single pixel in the V component plane.

Pixel processor 106 accesses captured bitmaps from memory device 112 via bus 108 and generates encoded image signals that represent one or more of the captured video images. Depending upon the particular encoding method implemented, as described in more detail below, pixel processor 106 applies a sequence of compression techniques to reduce the amount of data used to represent the information in each image. The encoded image may then be stored to memory device 112 via bus 108 for transmission to host processor 116 via bus 108, bus interface 110, and system bus 114 for storage in host memory 126.

Host processor 116 may transmit the encoded image to transmitter 118 for real-time transmission to a remote receiver (not shown in FIG. 1), store the encoded image to mass storage device 120 for future processing, or both. In addition, digital-to-analog converter 122 may receive and convert digital image signals to analog image signals for display in one or more windows on monitor 124. These image signals may correspond, for example, to raw captured video images or companded video images (i.e., the results of compressing and decompressing selected captured video images).

Figure 2:
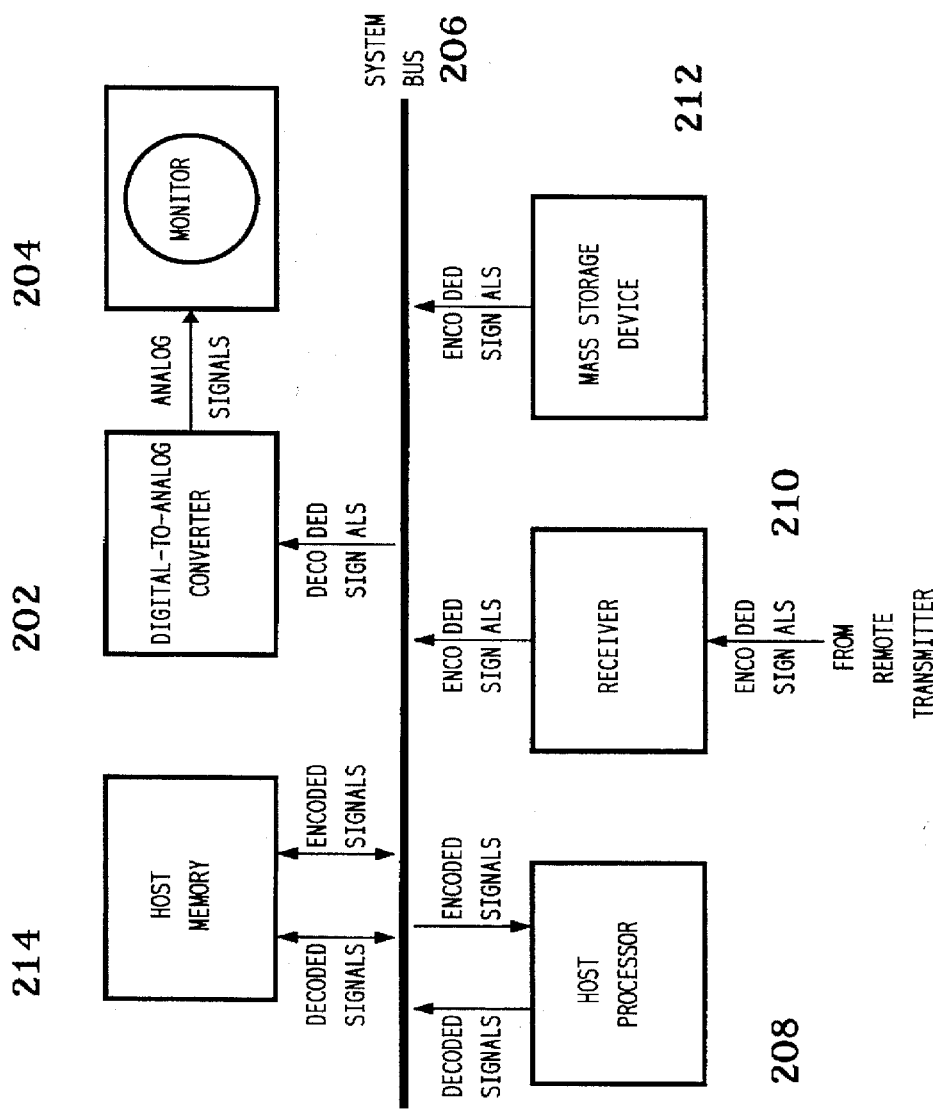
FIG. 2 is a computer-based decoding system for decoding the video signals encoded by the video processing system of FIG. 1, according to a preferred embodiment of the present invention.

Referring now to FIG. 2, there is shown a computer-based decoding system 200 for decoding the image signals encoded by encoding system 100 of FIG. 1, according to a preferred embodiment of the present invention. Host processor 208 of decoding system 200 receives encoded image signals via system bus 206 that were either stored in mass storage device 212 or received by receiver 210 from a remote transmitter, such as transmitter 118 of FIG. 1. The host processor 208 temporarily stores the encoded image signals in host memory 214.

Host processor 208 decodes the encoded image signals and scales the decoded image signals for display. Decoding the encoded image signals involves undoing the compression processing implemented by pixel processor 106 of encoding system 100 of FIG. 1. Scaling the decoded image signals involves upsampling the U and V component signals to generate full-sampled Y, U, and V component signals in which there is a one-to-one-to-one correspondence between Y, U, and V pixels in the scaled component planes. Scaling may also involve scaling the component signals to a display size and/or resolution different from the image signals as original captured. Host processor 208 then stores the scaled decoded image signals to host memory 214 for eventual transmission to digital-to-analog (D/A) converter 202 via system bus 206. D/A converter converts the digital scaled decoded image signals to analog image signals for display on monitor 204.

Referring again to FIG. 1, encoding system 100 is preferably a general microprocessor-based personal computer (PC) system with a special purpose video-processing plug-in board. In particular, A/D converter 102 may be any suitable means for decoding and digitizing analog video image signals. Capture processor 104 may be any suitable processor for capturing digitized video image component signals as subsampled pictures. Pixel processor 106 may be any suitable means for encoding subsampled video image signals, where the means is capable of implementing a forward discrete cosine transform. Memory device 112 may be any suitable computer memory device and is preferably a video random access memory (VRAM) device. Bus 108 may be any suitable digital signal transfer device and is preferably an Industry Standard Architecture (ISA) bus or Extended ISA (EISA) bus. Bus interface 110 may be any suitable means for interfacing between bus 108 and system bus 114. In a preferred embodiment, A/D converter 102, capture processor 104, pixel processor 106, bus 108, bus interface 110, and memory device 112 are contained in a single plug-in board, such as an Intel® ActionMedia®-II board, capable of being added to a general microprocessor-based personal computer (PC) system.

Host processor 116 may be any suitable means for controlling the operations of the special-purpose video processing board and is preferably an Intel® general purpose microprocessor such as an Intel® 386, 486, or Pentium® processor. Host memory 126 may be any suitable memory device used in conjunction with host processor 116 and is preferably a combination of random access memory (RAM) and read-only memory (ROM). System bus 114 may be any suitable digital signal transfer device and is preferably an Industry Standard Architecture (ISA) bus or Extended ISA (EISA) bus. Mass storage device 120 may be any suitable means for storing digital signals and is preferably a computer hard drive. Transmitter 118 may be any suitable means for transmitting digital signals to a remote receiver and preferably transmits digital signals over PSTN lines. Those skilled in the art will understand that the encoded video signals may be transmitted using any suitable means of transmission such as telephone line (PSTN or ISDN), RF antenna, local area network, or remote area network.

D/A converter 122 may be any suitable device for converting digital image signals to analog image signals and is preferably implemented through a personal computer (PC) -based display system such as a VGA or SVGA system. Monitor 204 may be any means for displaying analog image signals and is preferably a VGA monitor.

Referring now to FIG. 2, decoding system 200 is preferably a general microprocessor-based personal computer (PC) system similar to the basic PC system of encoding system 100. In particular, host processor 208 may be any suitable means for decoding and scaling encoded image signals and is preferably an Intel® general purpose microprocessor such as an Intel® 386, 486, or Pentium® processor. Host memory 214 may be any suitable memory device used in conjunction with host processor 116 and is preferably a combination of random access memory (RAM) and read-only memory (ROM). In an alternative preferred embodiment, decoding system 200 may also have a pixel processor similar to pixel processor 106 of FIG. 1 for decoding the encoded image signals and a display processor such as an Intel® i750® Display Processor for scaling the decoded image signals.

System bus 206 may be any suitable digital signal transfer device and is preferably an Industry Standard Architecture (ISA) bus or Extended ISA (EISA) bus. Mass storage device 212 may be any suitable means for storing digital signals and is preferably a CDROM device. Receiver 210 may be any suitable means for receiving the digital signals transmitted by transmitter 118 of encoding system 100. D/A converter 202 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encoded and decoded video image signals. Those skilled in the art will understand that such a combined system may be used to display decoded video image signals in real-time during the capture and encoding of video signals to monitor the encoding processing. In a preferred embodiment encoding system 100 encodes video image signals in real time to yield an encoded bitstream, and transmits the encoded bitstream to decoding system 200. Encoding system 100 detects and reduces the above-described mosquito artifacts as described in further detail hereinbelow.

Motion Estimation Techniques

The motion estimation procedure may be performed at the encoder level by comparing given regions or blocks within a current picture to many regions or blocks within the previous picture. The process of comparing a given block of one picture to blocks of another picture to find a sufficiently similar match is often called "block matching," and the process of comparing one picture against another in this manner is often called "picture differencing." Blocks are matched by determining a "difference measurement" between any given pair of blocks. A difference measurement corresponds to the overall degree of difference of the two regions. If the difference measurement is below a predetermined threshold, the blocks are considered to be similar enough that a block match is indicated. If so, the block in the previous picture may be utilized as described above by the video decoder to reproduce the same block in the current picture.

During motion estimation techniques, a picture is compressed by comparing it to a previous picture, often the immediately preceding picture in a motion video clip or sequence. Where similar blocks are found in the previous picture, a motion vector is transmitted instead of the pixels for that block, which allows the block to be reconstructed from the reference block in the previous picture. As will be understood by those skilled in the art, a difference block is also transmitted to reduce the residual errors remaining after motion compensation.

A first picture of a sequence has no previous picture so is sent without being encoded with motion estimation techniques. Such pictures are called "intra-pictures" or I pictures as described above, because the picture itself contains enough information for the receiving video processor to reconstruct it without referring to a previous picture. It will be understood that intra-pictures, while not encoded with motion estimation techniques, may be encoded with other data compression techniques that do not depend upon information from previous pictures.

Periodically, a new I picture must be sent, for otherwise cumulative errors may build up in the successively compressed and reconstructed pictures. I pictures may also be encoded and transmitted during transitions such as scene changes, in which previous pictures are too different from the current picture to allow for efficient motion estimation techniques. Scene cuts may be detected, as described immediately below.

Scene Cuts

As will be appreciated by those skilled in the art, various differencing methods may be used to determine the difference measurements described above. The basis of such a difference measurement, which is often utilized for block matching and picture differencing in motion estimation data compression techniques, is often a calculation known as the L1 Norm, which has the following form:

$$L1Norm = \sum_{i=0}^{i=n} \sum_{j=0}^{j=m} |a_{ij} - b_{ij}|$$

where:

$a_{ij}$ is a pixel in the ith row and jth column of the first picture;

$b_{ij}$ is a pixel in the ith row and jth column of the second picture;

n is the number of rows in a picture; and m is the number of columns in a picture.

It will be appreciated by those skilled in the art that the lower the difference indicated by the L1 Norm calculation, the more similar are the two pictures being compared. It will also be appreciated that calculations other than the L1 Norm may be utilized to perform difference measurements between two pictures. For example, the L2 Norm has the following form:

$$L2Norm = \sum_{i=0}^{i=n} \sum_{j=0}^{j=m} (a_{ij} - b_{ij})^2$$

It will also be understood that a very large difference between two consecutive pictures, i.e. a difference above a predetermined threshold, indicates a discontinuity or very abrupt change between the two pictures being compared. Thus, as those skilled in the art will appreciate, the L1 or L2 Norms may also be used to implement a scene cut detection technique as described above.

In terminology typically associated with video, a "video shot" is a sequence of pictures that occurs between two scene cuts or other transitions such as fades or cross-fades. Thus, a video shot is a sequence of continuously-filmed or produced pictures generated by a video camera.

Mosquito Artifact Detection

Figure 3A:
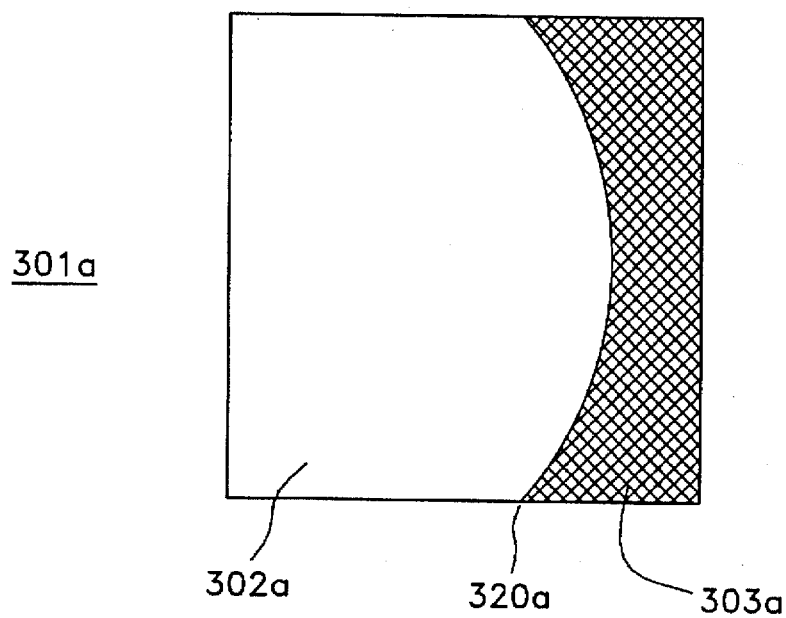
FIGS. 3A–B illustrate exemplary pictures utilized with motion estimation in accordance with the present invention.
Figure 3B:
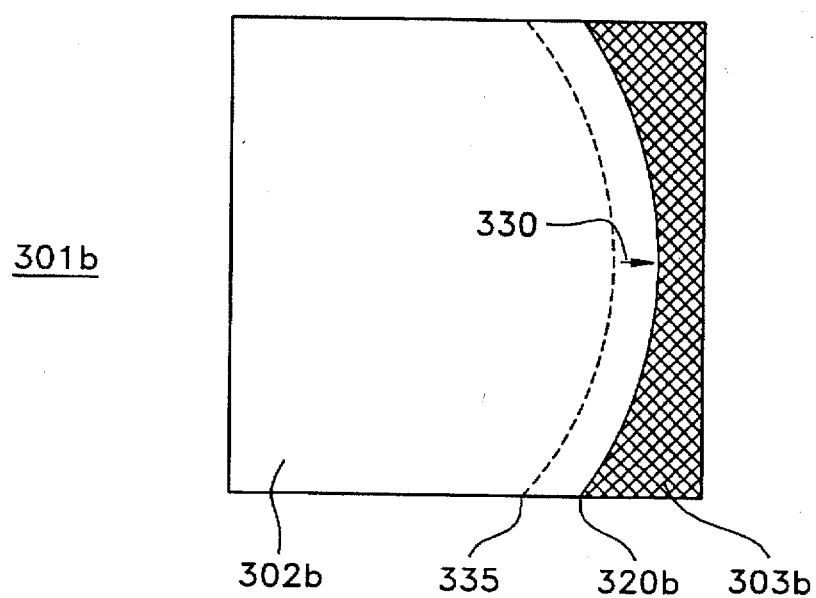

Referring now to FIGS. 3A–B, there are illustrated exemplary pictures 301a and 301b utilized with motion estimation in accordance with the present invention. The cross-hatched regions 303a, 303b of FIGS. 3A,B represent a stationary high spatial energy region, e.g. foliage which is associated with a zero motion vector. The plain regions 302a, 302b represent an object having small luminance variations, moving horizontally to the right and in front of regions 303a, 303b, which have large luminance variations. For example, regions 302a and 302b could represent a person dressed in a white garment moving in front of foliage, which represents regions 303a and 303b.

It will be appreciated that where a moving boundary is caused by a pan of a camera across an image such as the image in FIG. 3A, the boundary 320a may move from picture to picture, but the busy and flat regions will move along with the boundary. In this case, for a given block of the picture, a single motion vector can often be determined that can accurately be used to reconstruct the block, without giving rise to the mosquito or corona effect artifacts described herein. Thus, such a moving boundary is not considered to be a moving boundary of the type giving rise to the moving boundary problem discussed herein.

In the current example of FIGS. 3A–B, however, there are two possible motion vectors that could be determined in a motion estimation technique. Because busy region 303a is stationary, a zero vector may be utilized before performing block differencing. Alternatively, because flat region 302a is moving rightward (in picture 301a followed by picture 301b), a motion vector corresponding to the distance that region 302a moves may be utilized. It will be understood that such decisions are typically made on a block by block basis.

Figure 4:
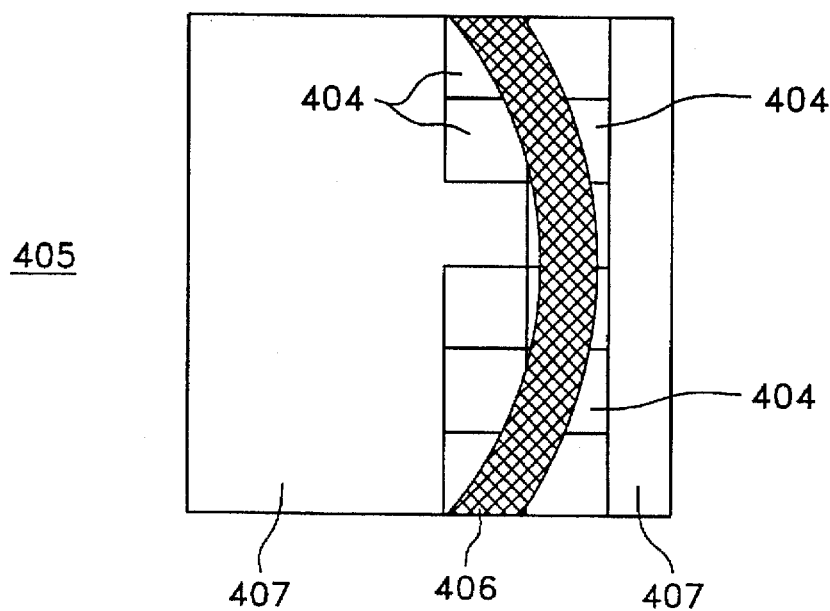
FIG. 4 illustrates a difference picture utilized with motion estimation in accordance with the present invention.

Referring now to FIG. 4, there is shown a difference picture 405 representing the difference between pictures 301a and 301b. Difference busy region 406 corresponds to portions of picture 301a that must be subtracted from picture 301a when reconstructing picture 301b when, for example, a zero vector is selected. As described above, encoding is performed on a block basis within a picture such as picture 301b. As illustrated in FIG. 4, blocks 404 (not drawn to scale) are shown that at least partially intersect difference busy region 406, such that each block 404 contains both busy and flat pixels.

Figure 5:
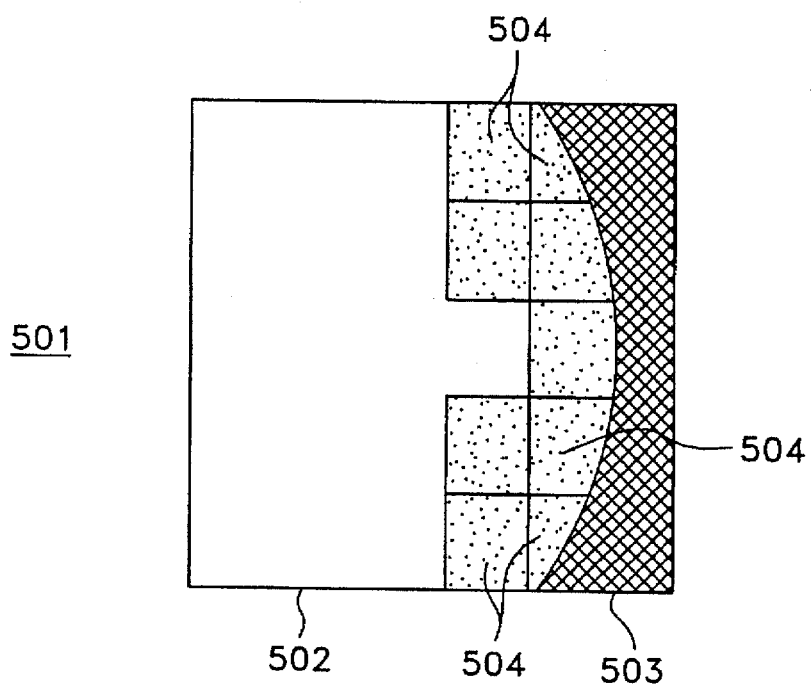
FIG. 5 illustrates a picture reconstructed from the picture of FIG. 3B and containing artifacts that are detected and reduced by the present invention.

Referring now to FIG. 5, there is shown a picture 501 reconstructed from picture 301b of FIG. 3B and containing artifacts that are detected and reduced by the present invention. Blocks 504 of reconstructed picture 501 correspond to blocks 404 of difference picture 405. Each block 404 comprises both high spatial energy and flat regions. Therefore, during encoding and quantizing of each block 404 to transmit difference blocks used to reconstruct picture 301b, the above-described mosquito artifacts may be produced in many or all of corresponding blocks 504 upon decoding.

It will be understood that the phenomenon arises because for a block 404, the quantization level selected will likely be too coarse to adequately represent the high frequency DCT coefficients caused by a busy region within each block 404. The high frequency DCT coefficients will be excited enough by the difference busy region 406 so that they will not be coded very accurately, either because the quantization level is set too high, or because there are so many that they are truncated because not enough bits can be spared to encode them. When these DCT coefficients for a block 404 are decoded to yield an (8×8) block, because the DCT coefficients were inadequately encoded the residual DCT energy will be spread more or less randomly across the (8×8) block, and will appear as noise or mosquitoes. The mosquitoes so produced are visible in flat regions of block 404, as illustrated by small specks or dots in blocks 504 of FIG. 5. It will be understood that any blocks lying wholly within difference busy region 406 may still produce such artifacts, but they will be less visible upon reconstruction because they will be displayed upon a busy background only.

Figure 6:
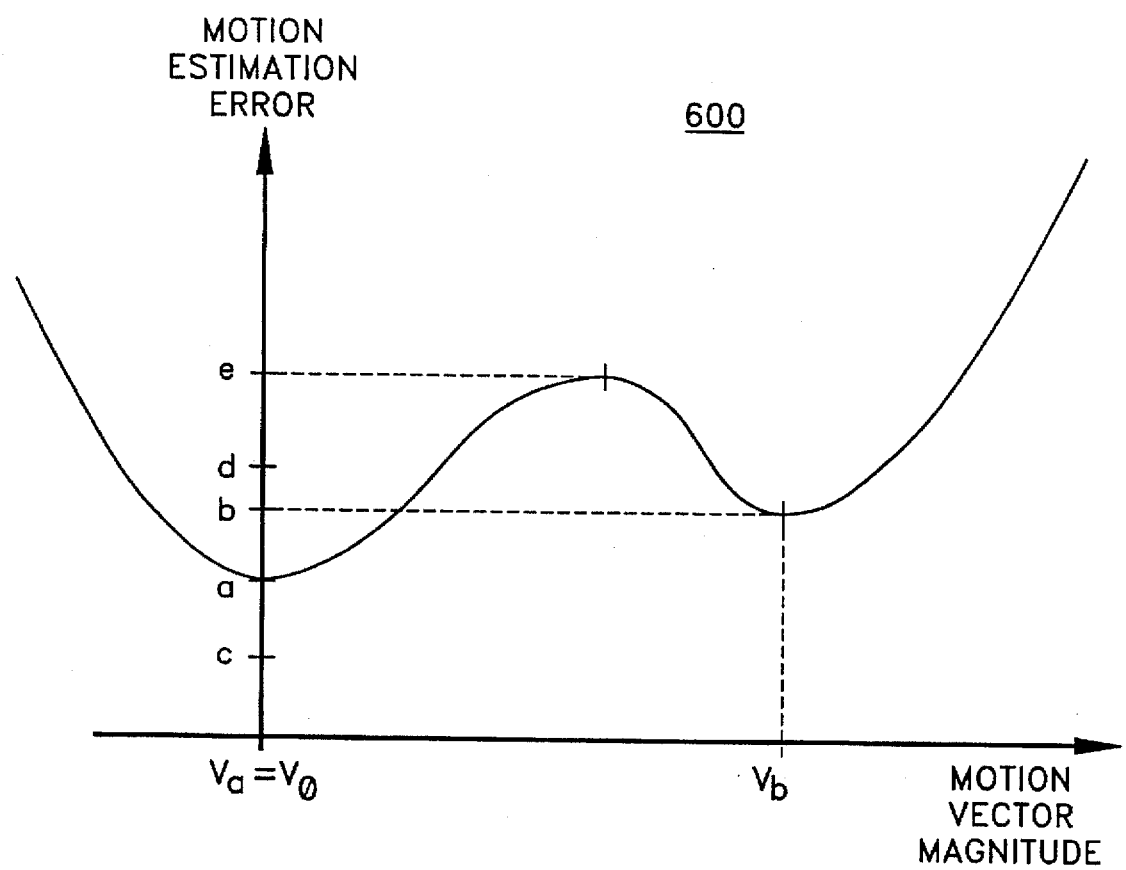
FIG. 6 is a graph plotting the motion estimation residual error versus motion vector magnitude in accordance with the method of operation of the video system of FIG. 1.

Referring now to FIG. 6, there is shown graph 600 plotting an example of motion estimation residual error versus motion vector magnitude in accordance with the method of operation of video system 100 of FIG. 1. As will be appreciated by those skilled in the art, motion estimation error may be determined by utilizing a difference measure such as the L1 or L2 Norms described hereinabove. Various motion vectors point to different blocks within a reference picture. When a motion vector references an identical block to the block to be encoded, corresponding pixels between the two compared blocks are identical and thus the motion estimation error is zero. If the error is below a certain threshold such as threshold error d of FIG. 6, normally a decision is made that the blocks are close enough so that motion estimation may be utilized to efficiently encode the current block of the current picture.

As illustrated in graph 600, however, it is possible for more than one local minimum to be produced, both below a threshold such as threshold d, when a moving boundary exists between flat and busy regions of a block, and when the flat and busy regions are moving in accordance with different vectors. When two such minima exist such as illustrated in FIG. 6, this indicates that a difference region such as difference busy region 406 will be encoded in the difference picture 405, and will give rise to mosquitoes as illustrated in reconstructed picture 501 of FIG. 5. A moving boundary that may be detected between relatively flat and busy regions, where the flat and busy regions are moving in accordance with different vectors (i.e., at different speeds or in different directions) is sometimes referred to herein as the moving boundary problem.

When two such minima exist, each of which may be below threshold d and thus indicate to the encoder that motion estimation encoding should be performed for the present block, an encoder may tend to select, for example, the minimum corresponding to the lowest motion estimation error. As illustrated in FIG. 6, error level a corresponding to a zero magnitude motion vector Va, is lower than error level b, corresponding to vector Vb. However, whether vector Va or vector Vb is utilized to encode blocks of picture 301b, the fact that there is a moving boundary between flat and busy regions moving at different vectors will cause a difference picture such as picture 405, thereby producing mosquitos in decoded picture 501 in blocks nearby the moving boundary area (i.e., in blocks of picture 501 that partially cover the area of difference region 406).

Therefore, in the present invention it is recognized when the above-described moving boundary problem is present, and steps are then taken to avoid encoding methods that will produce mosquitoes. According to a preferred embodiment, if at least one motion vector is determined that corresponds to a motion estimation error less than threshold d, then the block is a candidate for motion estimation. If another motion vector is discovered that also gives rise to a local minimum lower than threshold d, then it is determined whether the two minima are local minima or parts of a single minimum. If vectors linearly interpolated between the two vectors produce a motion estimation error reaching a peak higher than both minima, this indicates a moving boundary condition between busy and flat regions.

As shown in FIGS. 3A–B, possible motion vectors considered are horizontal motion vectors of varying magnitudes, because boundary 320a of FIG. 3A is moving horizontally to the right, as can be seen in corresponding boundary 320b of FIG. 3B. Also as shown in FIG. 3B, boundary 335 (corresponding to previous boundary 320a of FIG. 3A) is moving generally rightward to boundary 320b, as indicated by vector 330 of FIG. 3B. A zero motion vector $V_0$=Va of FIG. 6 corresponds to minimum a, and vector Vb corresponds to minimum b, both of which are below threshold d. Additionally, minima a and b are indeed independent, local minima, because the motion estimation error rises to a peak between vectors Va and Vb, for horizontal motion vectors of varying length between Va and Vb. In a preferred embodiment, a moving boundary problem is determined to exist when at least two minima a and b exist below a threshold d, with an interposed maximum more than another threshold above the maximum of a and b. Thus, if (e−max (a,b))>threshold, then a moving boundary problem is determined to exist.

When pixel processor 106 of FIG. 1 determines this potential moving boundary problem, it is determined how to encode the current block. If the lowest of the two (or more) minima is below a still lower threshold c, as shown in FIG. 6, then despite the moving boundary between relatively flat and busy regions having different motion vectors, the relative difference in motion or flatness/business may be determined to be insignificant enough to utilize standard motion estimation to encode the block. Thus, for example, if the spatial energy of busy region 303b of FIG. 3B were not much higher than that of flat region 302b, then minimum a might be below a very low threshold c so that the above-described mosquitoes artifact will be tolerable when the block is encoded via motion estimation.

If, however, both minima are above lower threshold c, then standard motion estimation encoding of the current block should be avoided in order to avoid significant artifacts in the reconstructed picture 501. In a preferred embodiment, when such a severe mosquito problem is detected, a decision may be made to encode the entire block

301b as an I block, although this requires more bits than otherwise planned for.

Alternatively, a very fine quantization level may be selected for the current block with the moving boundary problem. In this implementation, the flatness (i.e., the lack of spatial energy) of any flat regions of the block are determined. Pixel processor 106 then determines how low of a quantizer level must be selected for the entire block so that any mosquitoes are not noticeable. In another embodiment, when the moving boundary problem is determined, pixel processor 106 automatically selects the next-lower quantizer level than the level that would have been used. Alternatively, a lower quantizer level may be selected that will produce a codesize of approximately twice the length of the codesize that would have been produced by encoding the block with the quantizer level that otherwise would have been used.

In a further alternative preferred embodiment, when the above-mentioned moving boundary problem is determined, a low pass filter may be applied to the block to filter out high frequencies prior to quantizing the block. The following Table 1 provides examples of low-pass spatial filters that may be used to reduce high frequencies within a block.

TABLE 1

Example Tap Weights With Two-Dimensional Spatial Filters

| 1  | 14  | 1  | 1 | 6  | 1 | 1 | 2 | 1 |
|----|-----|----|---|----|---|---|---|---|
| 14 | 196 | 14 | 6 | 36 | 6 | 2 | 4 | 2 |
| 1  | 14  | 1  | 1 | 6  | 1 | 1 | 2 | 1 |
|    | (a) |    |   | (b)|   |   | (c)|  |

As will be understood, such filters may be applied to individual pixels within a block by multiplying a pixel and its eight neighbors by the corresponding numbers in the filter, and dividing the sum of these products by the total weights of the filter. Thus, filter (a) is the weakest, and (c) the strongest, of the filters in Table 1. These filters may be applied iteratively to achieve a block with a desired level of high spatial energy remaining that will result in an acceptable number, range, and magnitude of DCT coefficients.

In yet another alternative preferred embodiment, the current block may be separately encoded and transmitted as an I block, despite other blocks within the current picture 301b being encoded via motion estimation.

Figure 8:
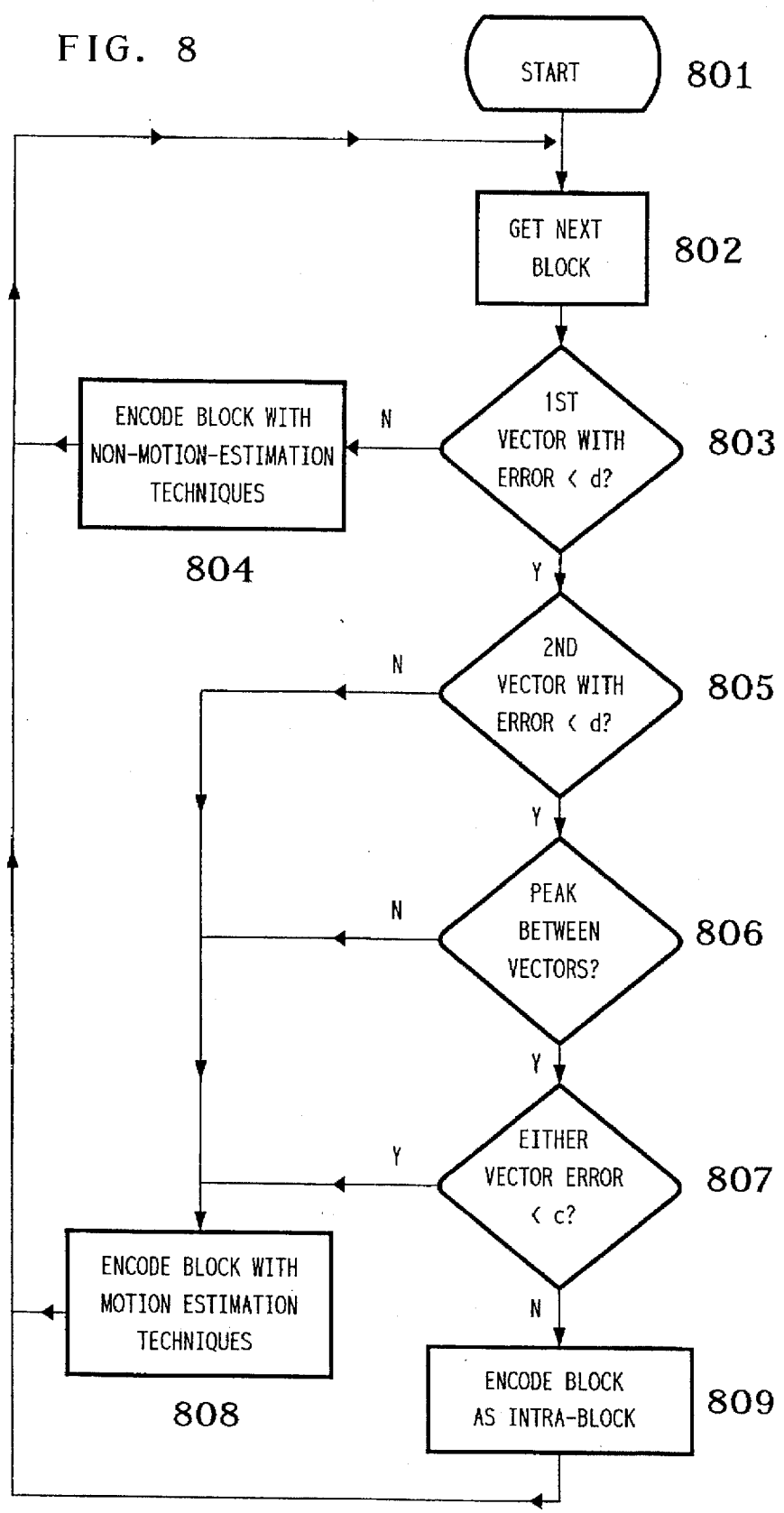
FIG. 8 is a flow chart of the method of operation of the video system of FIG. 1 in accordance with the present invention.

The method of operation of the present invention, as implemented on video system 100, will now be described with reference to the flow chart of FIG. 8. As illustrated in step 802 of FIG. 8, pixel processor 106 of FIG. 1 gets a next block to encode, such as a block of picture 302b. A motion estimation search is performed, and it is then determined from the result of this search whether there is a first motion vector corresponding to a motion estimation error less than d (step 803). If not, then the no match is found and the block is not a candidate for motion compensation encoding, and non-motion estimation encoding techniques are utilized to encode the block (step 804).

If there is a first motion vector having error less than d, however, the block is a candidate for motion estimation encoding, provided a severe moving boundary problem, and thus the hereinabove-described mosquitoes artifact problem, is not detected. Therefore, pixel processor 106 next determines whether there is also a second motion vector associated with an error less than d (step 805). If not, the block is encoded with motion estimation encoding (step 808). If so, however, to ensure that the minima associated with the two vectors are independent local minima rather than associated with a single trough or minimum, pixel processor 106 determines whether there is a peak or interposed maximum higher than both minima associated with a vector linearly interpolated between the two motion vectors (step 806). Step 806 outputs "yes" only if the maximum e is more than a threshold above the higher of the first and second vectors' respective minima. I.e., step 806 outputs "yes" only if (e−max(a,b))>threshold. If there is no such maximum interposed between the two vectors, the block is encoded with motion estimation encoding (step 808).

Next, pixel processor 106 determines whether either of the two motion vectors are associated with an error below a threshold c (step 807). If so, as described above, the block is encoded with motion estimation encoding (step 808) despite the detection of a moving boundary, because the mosquitoes artifact problem will be relatively minor if either motion vector produces such a small amount (i.e., below c) of error. Otherwise, however, it is determined that a severe moving boundaries problem exists and the block is encoded as an intra-block (step 809) rather than with motion compensation, to prevent the above-described artifact from appearing in the reconstructed version of the block produced by decoding system 200.

It will be understood that the encoding method of step 809 may be any encoding method that avoids the artifactual problems discussed herein, such as by encoding the entire picture of which the current block is a part as an I picture; using a very fine quantization level to encode the block; or applying a low pass filter to the block to filter out high frequencies prior to quantizing the block.

Figure 7A:
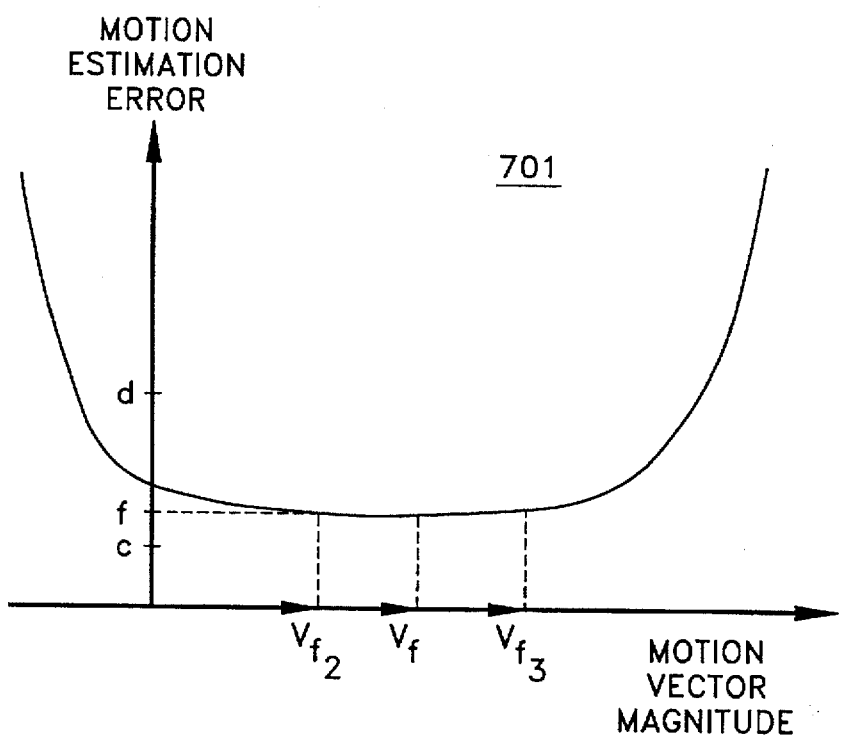
FIGS. 7A–C are further graphs plotting the motion estimation residual error versus motion vector magnitude in accordance with the method of operation of the video system of FIG. 1.
Figure 7B:
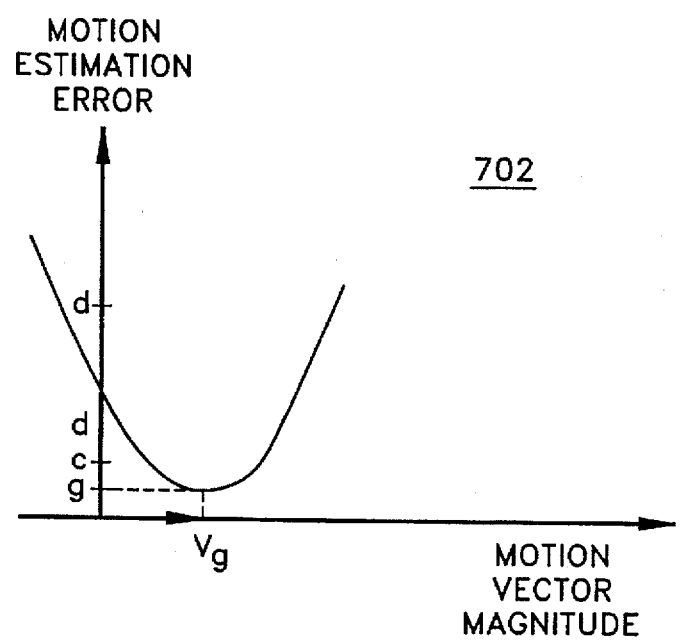
Figure 7C:
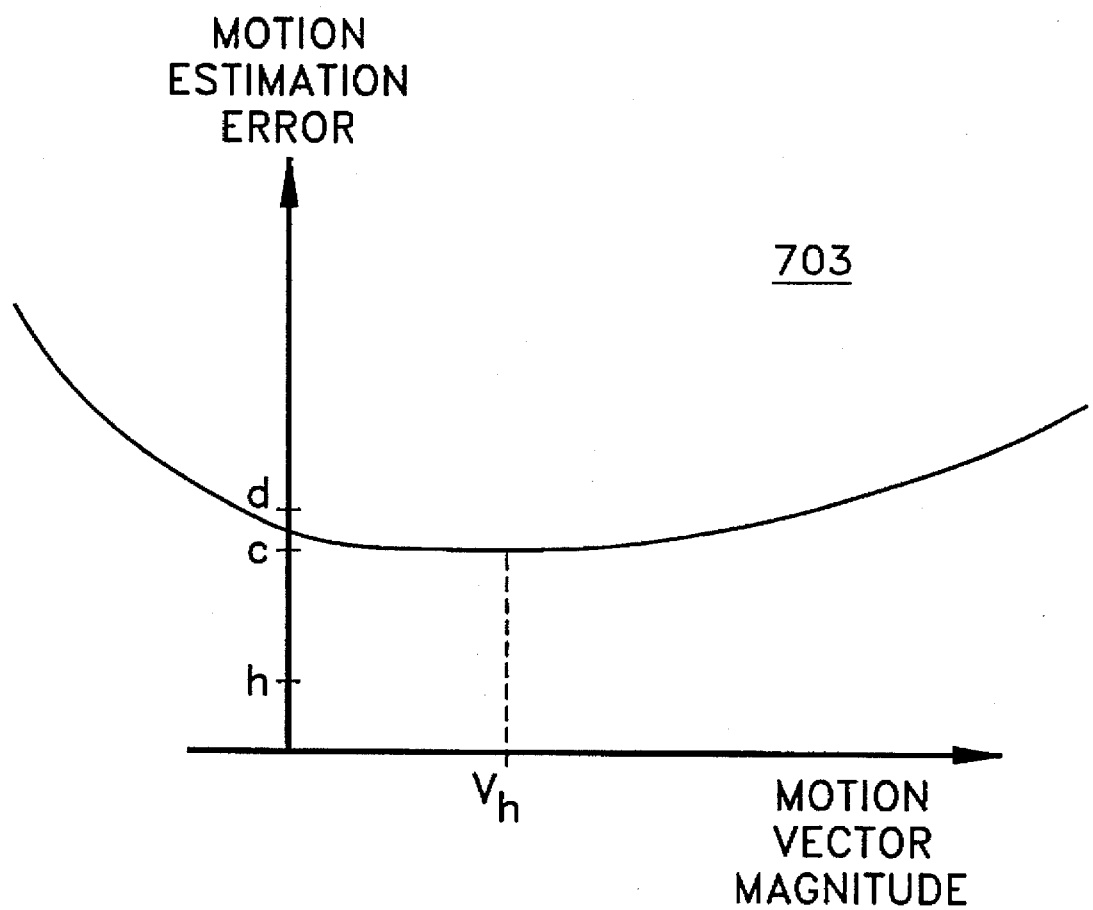

Referring now to FIGS. 7A–C are further graphs plotting the motion estimation residual error versus motion vector magnitude in accordance with the method of operation of the video system of FIG. 1. Typically, in the case, for example, of a pan, where all regions within an image move along the same vector, there will be no moving boundary problem, and the motion estimation error curve will reach a minima fairly distinctly. A pan causing the entire image to move along vector Vg yields a motion estimation error curve as illustrated in curve 702. As shown in FIG. 7B, such a curve is associated with an error minima g, which may be quite low, even below threshold c. Thus, curve 702 illustrates the prototypical error curve characteristic accompanying a good candidate for motion estimation encoding.

When a large number of regions within a sequence of pictures are moving along different vectors, a curve such as curve 702 of FIG. 7B will not exist. As disclosed above, in a preferred embodiment, a moving boundary problem is determined to exist when at least two minima a and b, as shown in FIG. 6, exist below a threshold d, with an interposed maximum more than another threshold above the maximum of a and b. Thus, if (e−max(a,b))>threshold, then a moving boundary problem is determined to exist. As will be understood by those skilled in the art, more than two regions within a sequence of pictures may be moving at different speeds and/or directions, which can give rise to the moving boundary problem described herein when at least one of these regions is relatively flat and at least one of these regions is relatively busy. For example, three regions, two flat and one busy, may all be moving at different velocities. In this case, three minima may be determined for three different motion vectors, each motion vector corresponding to the motion of one of the three regions. As described above, if each minima is below a threshold d, with an interposed maximum between each pair of minima, then a moving boundary problem may be determined to exist.

However, the peaks between various minima associated with these vectors might not exist in some cases. Instead of a motion estimation error curve as shown in FIG. 6, with two distinct minima separated by an interposed maximum, or several distinct minima separated by interposed maxima, a curve such as curve 701 of FIG. 7A may be produced. Unlike curve 702, curve 702 contains a relatively flat region around a minima f, roughly corresponding to motion vector Vf, and relatively steeply sloping sides. In this case, several motion vectors, such as motion vectors Vf, Vf2, and Vf3, may all be represented by the flat trough of curve 701, but may not be easily distinguishable because there are no peaks interposed therebetween. However, when it is detected that an error curve exists having a relatively long, flat trough and relatively steeply sloping sides, with the minima above a small threshold c, then a moving boundary problem may be determined to exist.

As will be appreciated by those skilled in the art, the trough flatness may be detected by determining if two vectors Vf2 and Vf3 a predetermined distance away from the single minima vector Vf also yield minima below threshold d. Thus, if vectors Vf, Vf2, and Vf3 are all below threshold d, then the trough of the error curve may be determined to be flat.

However, it is also necessary to determine whether the sides of the error curve are relatively steep. The reason for this is that a curve with a relatively flat trough and gently sloping sides may be produced by moving boundaries associated primarily with low-spatial energy regions, e.g. clouds, which do not cause the mosquitoes artifact problem discussed herein. An example of a curve having a relatively flat trough, a minima below threshold d, and gently sloping sides that might correspond to a low spatial energy picture such as clouds moving in different directions is illustrated as curve 703 of FIG. 7C. Thus, the slope of curve 701 of FIG. 7A may be measured at a predetermined distance to the left and right of the motion vector Vb, and compared to a predetermined threshold.

Therefore, the moving boundary problem described herein may be detected by detecting two or more distinct minima, as described with reference to FIG. 6, or by detecting an error curve with a relatively long, flat trough and relatively steep sides, as discussed with reference to FIGS. 7A–C.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A computer-implemented method for processing video signals representative of pixels of a current block of a current picture, the method comprising the steps of:
    (a) comparing the current block to a plurality of blocks of a previous picture to provide a plurality of corresponding motion vectors, wherein each motion vector corresponds to a respective motion estimation error measure;
    (b) determining whether the current block contains at least one region of high spatial energy and at least one region of relatively low spatial energy associated with different motion vectors of the plurality of corresponding motion vectors; and
    (c) encoding the block in accordance with the determination of step (b).

2. The method of claim 1, wherein step (b) comprises the steps of:
    (1) determining whether a first motion vector and a second motion vector each correspond to a respective motion estimation error below a first threshold error; and
    (2) determining whether there is a third motion vector between the first and second motion vectors having a motion estimation error greater than the respective motion estimation errors of the first and second motion vectors.

3. The method of claim 2, wherein the third motion vector is linearly interpolated between the first and second motion vectors.

4. The method of claim 2, wherein step (b)(2) further comprises the step of determining whether the difference between the motion estimation error of the third motion vector and the greater of the motion estimation errors of the first and second motion vectors is greater than a second threshold error.

5. The method of claim 4, wherein:
    the third motion vector is linearly interpolated between the first and second motion vectors; and
    step (c) comprises the steps of:
        (1) determining whether at least one of the respective motion estimation errors of the first and second motion vectors is below a third threshold error and, if so, encoding the current block in accordance with motion estimation, wherein the third threshold error is below the first threshold error;
        (2) otherwise encoding the current block as an intrablock.

6. The method of claim 4, wherein:
    the current block is associated with an initial quantization level;
    the third motion vector is linearly interpolated between the first and second motion vectors; and
    step (c) comprises the steps of:
        (1) determining whether at least one of the respective motion estimation errors of the first and second motion vectors is below a third threshold error and, if so, encoding the current block in accordance with motion estimation, wherein the third threshold error is below the first threshold error;
        (2) otherwise, encoding the current block with a second quantization level finer than the initial quantization level, wherein the second quantization level is sufficient to reduce quantization artifacts otherwise caused by the region of high spatial energy and the region of relatively low spatial energy associated with different motion vectors.

7. The method of claim 4, wherein:
    the third motion vector is linearly interpolated between the first and second motion vectors; and
    step (c) comprises the steps of:
        (1) determining whether at least one of the respective motion estimation errors of the first and second motion vectors is below a third threshold error and, if so, encoding the current block in accordance with motion estimation, wherein the third threshold error is below the first threshold error;
        (2) otherwise, applying a low pass filter to the current block a number of times sufficient to reduce quantization artifacts otherwise caused by the region of high spatial energy and the region of relatively low spatial energy associated with different motion vectors.

8. The method of claim 1, wherein step (b) comprises the steps of:
    (1) determining whether a first motion vector and a second motion vector each correspond to a respective motion estimation error below a first threshold error;

(2) forming a motion estimation error curve comprising the respective motion estimation errors of the first and second motion vectors and of a second plurality of motion vectors comprising motion vectors linearly interpolated from the first and second motion vectors; and (3) determining whether the motion estimation error curve comprises a relatively flat trough and relatively steep sides.

9. A computer-implemented apparatus for processing video signals representative of pixels of a current block of a current picture, the apparatus comprising:

(a) means for comparing the current block to a plurality of blocks of a previous picture to provide a plurality of corresponding motion vectors, wherein each motion vector corresponds to a respective motion estimation error measure;

(b) means for determining whether the current block contains at least one region of high spatial energy and at least one region of relatively low spatial energy associated with different motion vectors of the plurality of corresponding motion vectors; and (c) means for encoding the block in accordance with the determination of means (b).

10. The apparatus of claim 9, wherein means (b) comprises:

(1) means for determining whether a first motion vector and a second motion vector each correspond to a respective motion estimation error below a first threshold error; and (2) means for determining whether there is a third motion vector between the first and second motion vectors having a motion estimation error greater than the respective motion estimation errors of the first and second motion vectors.

11. The apparatus of claim 10, wherein the third motion vector is linearly interpolated between the first and second motion vectors.

12. The apparatus of claim 10, wherein means (b)(2) further comprises means for determining whether the difference between the motion estimation error of the third motion vector and the greater of the motion estimation errors of the first and second motion vectors is greater than a second threshold error.

13. The apparatus of claim 12, wherein:

the third motion vector is linearly interpolated between the first and second motion vectors; and means (c) comprises:

(1) means for determining whether at least one of the respective motion estimation errors of the first and second motion vectors is below a third threshold error and, if so, encoding the current block in accordance with motion estimation, wherein the third threshold error is below the first threshold error;

(2) means for otherwise encoding the current block as an intra-block.

14. The apparatus of claim 13, wherein the apparatus is electrically connected to a bus and the bus is electrically connected to a memory device.

15. The apparatus of claim 12, wherein:

the current block is associated with an initial quantization level;

the third motion vector is linearly interpolated between the first and second motion vectors; and means (c) comprises:

(1) means for determining whether at least one of the respective motion estimation errors of the first and second motion vectors is below a third threshold error and, if so, encoding the current block in accordance with motion estimation, wherein the third threshold error is below the first threshold error;

(2) means for otherwise encoding the current block with a second quantization level finer than the initial quantization level, wherein the second quantization level is sufficient to reduce quantization artifacts otherwise caused by the region of high spatial energy and the region of relatively low spatial energy associated with different motion vectors.

16. The apparatus of claim 12, wherein:

the third motion vector is linearly interpolated between the first and second motion vectors; and means (c) comprises:

(1) means for determining whether at least one of the respective motion estimation errors of the first and second motion vectors is below a third threshold error and, if so, encoding the current block in accordance with motion estimation, wherein the third threshold error is below the first threshold error;

(2) means for otherwise applying a low pass filter to the current block a number of times sufficient to reduce quantization artifacts otherwise caused by the region of high spatial energy and the region of relatively low spatial energy associated with different motion vectors.

17. The apparatus of claim 9, wherein means (b) comprises:

(1) means for determining whether a first motion vector and a second motion vector each correspond to a respective motion estimation error below a first threshold error;

(2) means for forming a motion estimation error curve comprising the respective motion estimation errors of the first and second motion vectors and of a second plurality of motion vectors comprising motion vectors linearly interpolated from the first and second motion vectors; and (3) means for determining whether the motion estimation error curve comprises a relatively flat trough and relatively steep sides.

18. The apparatus of claim 9, wherein the apparatus is electrically connected to a bus and the bus is electrically connected to a memory device.

* * * * *